United States Patent [19]
Dixon

[11] Patent Number: 5,515,506
[45] Date of Patent: May 7, 1996

[54] ENCODING AND DECODING OF DUAL-PORTED RAM PARITY USING ONE SHARED PARITY TREE AND WITHIN ONE CLOCK CYCLE

[75] Inventor: Daniel J. Dixon, Fort Collins, Colo.

[73] Assignee: Hewlett-Packard Company, Palo Alto, Calif.

[21] Appl. No.: 294,462

[22] Filed: Aug. 23, 1994

[51] Int. Cl.$^6$ ................................................ G06F 11/10
[52] U.S. Cl. ............................. 395/183.18; 395/185.01; 371/49.2
[58] Field of Search .................... 371/48, 49.1, 49.2, 371/49.3, 51.1, 50.1, 3; 395/575, 425, 183.18, 185.01, 425, 489

[56] References Cited

U.S. PATENT DOCUMENTS

| | | | |
|---|---|---|---|
| 3,602,886 | 8/1971 | Carter | 340/146.1 |
| 4,205,301 | 5/1980 | Hisazawa | 371/3 |
| 4,670,876 | 6/1987 | Kirk | 371/3 |
| 4,682,334 | 7/1987 | Le Mouel et al. | 371/55 |
| 4,809,273 | 2/1989 | Jackowski et al. | 371/3 |
| 5,095,485 | 3/1992 | Sato | 371/51.1 |
| 5,268,909 | 12/1993 | Loebig | 371/49.1 |
| 5,396,505 | 3/1995 | Freeman et al. | 371/57.1 |

*Primary Examiner*—Robert W. Beausoliel, Jr.
*Assistant Examiner*—Alan M. Fisch
*Attorney, Agent, or Firm*—Augustus W. Winfield

[57] ABSTRACT

A parity generation circuit for an internal cache memory of a computer processor. The parity generation circuit generates parity for both reading and writing during execution of a single processor instruction. The parity generation circuit saves processor circuitry by sharing one parity logic tree for both reading and writing. During one clock phase, a multiplexer routes data to the memory through the parity logic tree and a demultiplexer routes parity from the parity logic tree to the memory. During a second clock phase, the multiplexer routes data from the memory through the parity logic tree and the demultiplexer routes parity from the parity logic tree to the processor.

2 Claims, 6 Drawing Sheets

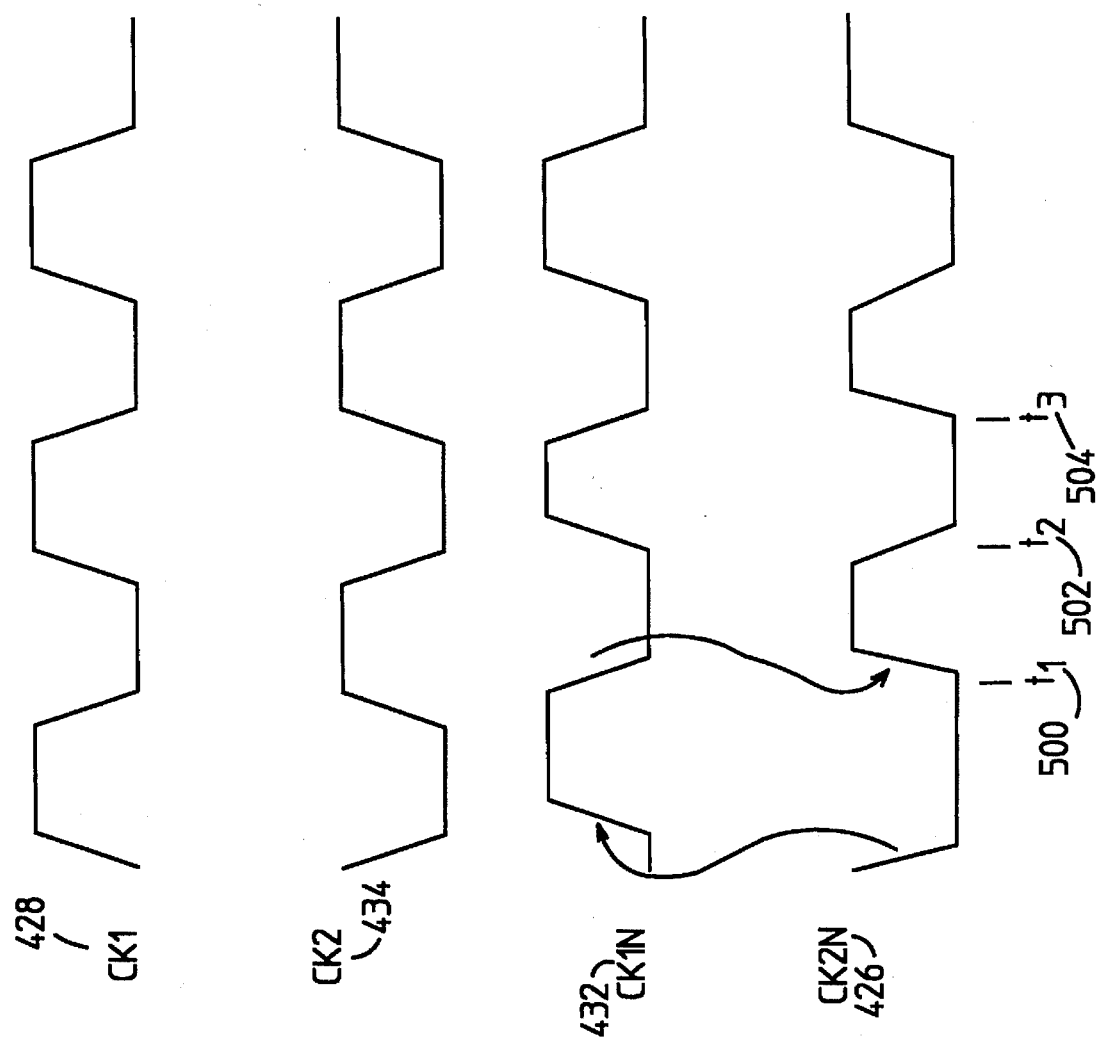

ENCODING AND DECODING OF DUAL-PORTED RAM PARITY USING ONE SHARED PARITY TREE AND WITHIN ONE CLOCK CYCLE

FIELD OF INVENTION

This invention relates generally to computers and digital logic circuitry and more specifically to parity circuits for memory data error checking.

BACKGROUND OF THE INVENTION

When a binary number is written to memory by a computer processor, the processor or external memory circuitry may append one or more additional bits for error checking, called parity bits. Typically, a single parity bit indicates whether the number of ones (or zeros) in a group of binary digits is odd or even. Likewise, when a group of binary digits is read from memory, the processor or external memory circuitry determines whether the number of ones (or zeros) in the data received is odd or even and compares the result to a received parity bit. If the received parity bit and the computed parity bit are different, an error must have occurred and other action is required.

A modern trend in processor design is to place more and more functionality onto a single integrated circuit. In particular, a processor integrated circuit may include internal cache memory to provide rapid access to the most recently used data. If cache memory is included on the processor chip, then parity encoding circuitry and parity decoding circuitry must also be on the chip. In addition, for optimal performance, it is desirable to be able to both read from a cache and write to a cache during a single clock cycle. Reading and writing during a single cycle typically requires parity encoding circuitry and parity decoding circuitry to be separate circuits. The requirement for separate circuits increases the amount of chip space consumed by parity encoding and decoding. There is a need for reducing the overall system circuitry by sharing parity circuitry for both encoding and decoding. There is a particular need for circuitry sharing when the parity circuitry is included within an integrated circuit processor and both memory reading and writing occur during a single clock cycle.

SUMMARY OF THE INVENTION

A parity encoding and decoding system is provided that employs a single parity logic tree with two multiplexed inputs. One input is data being written to memory. The second input is data being read from memory. During a memory read, the single bit output of the parity logic tree is compared to a parity bit received from the memory. The resulting error signal is sent to the processor reading from memory. During a memory write, the single bit output of the parity logic tree is also written to the memory. The shared parity logic tree reduces the circuitry required for an integrated processor while still permitting both reading and writing of memory during a single computer operation.

BRIEF DESCRIPTION OF THE DRAWINGS

FIG. 5B is timing diagram of the clock signals of FIGS. 4 and 5A.

DETAILED DESCRIPTION OF THE PREFERRED EMBODIMENT OF THE INVENTION

Figure 1:
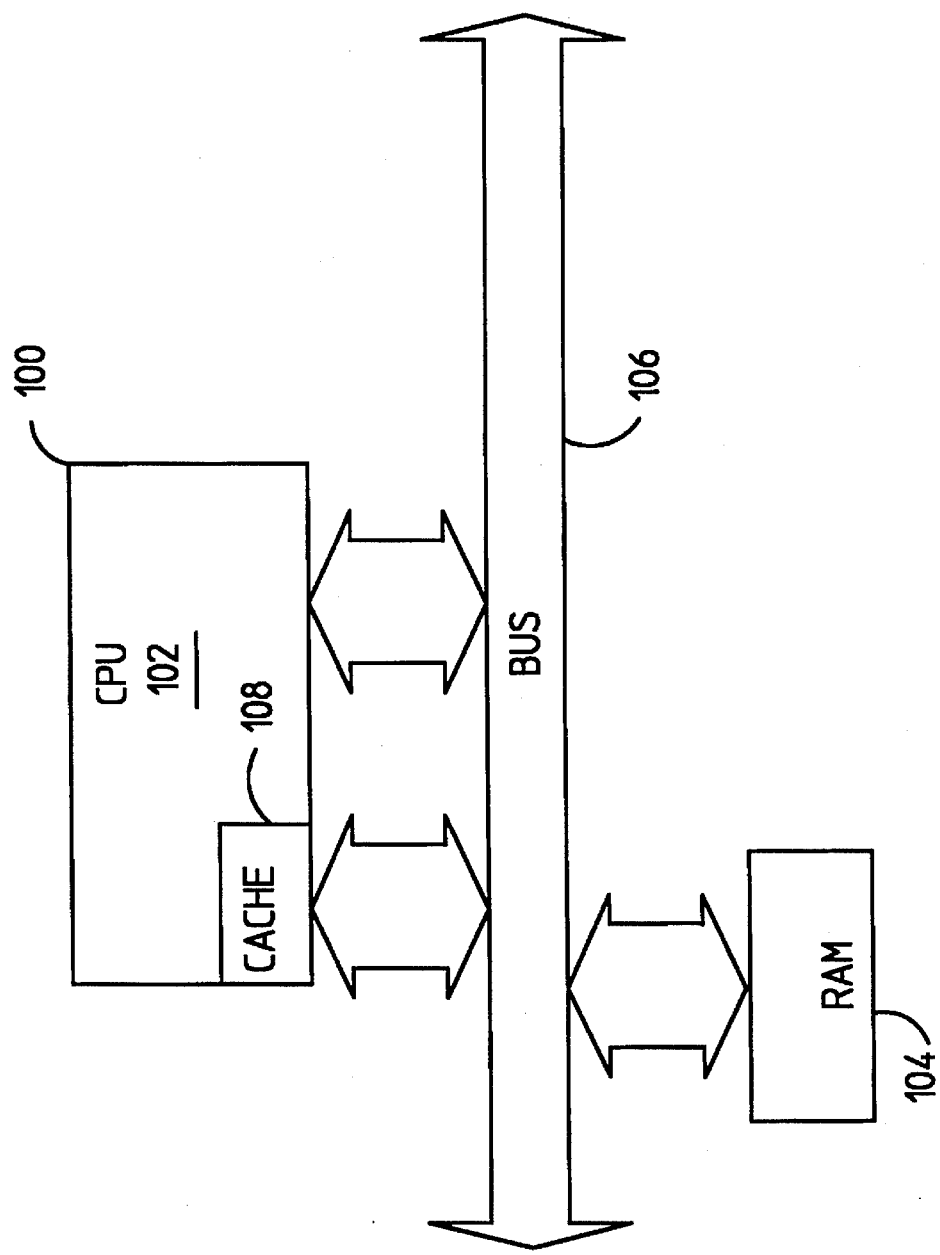
FIG. 1 is a block diagram illustrating a computer system containing the invention.

FIG. 1 is a block diagram of a computer system. An integrated circuit 100 contains a central processing unit (CPU) 102 that reads and writes to external random access memory (RAM) 104 over a data bus 106. The most recently used data is stored in a cache memory 108 that is internal to the integrated circuit 100.

Figure 2:
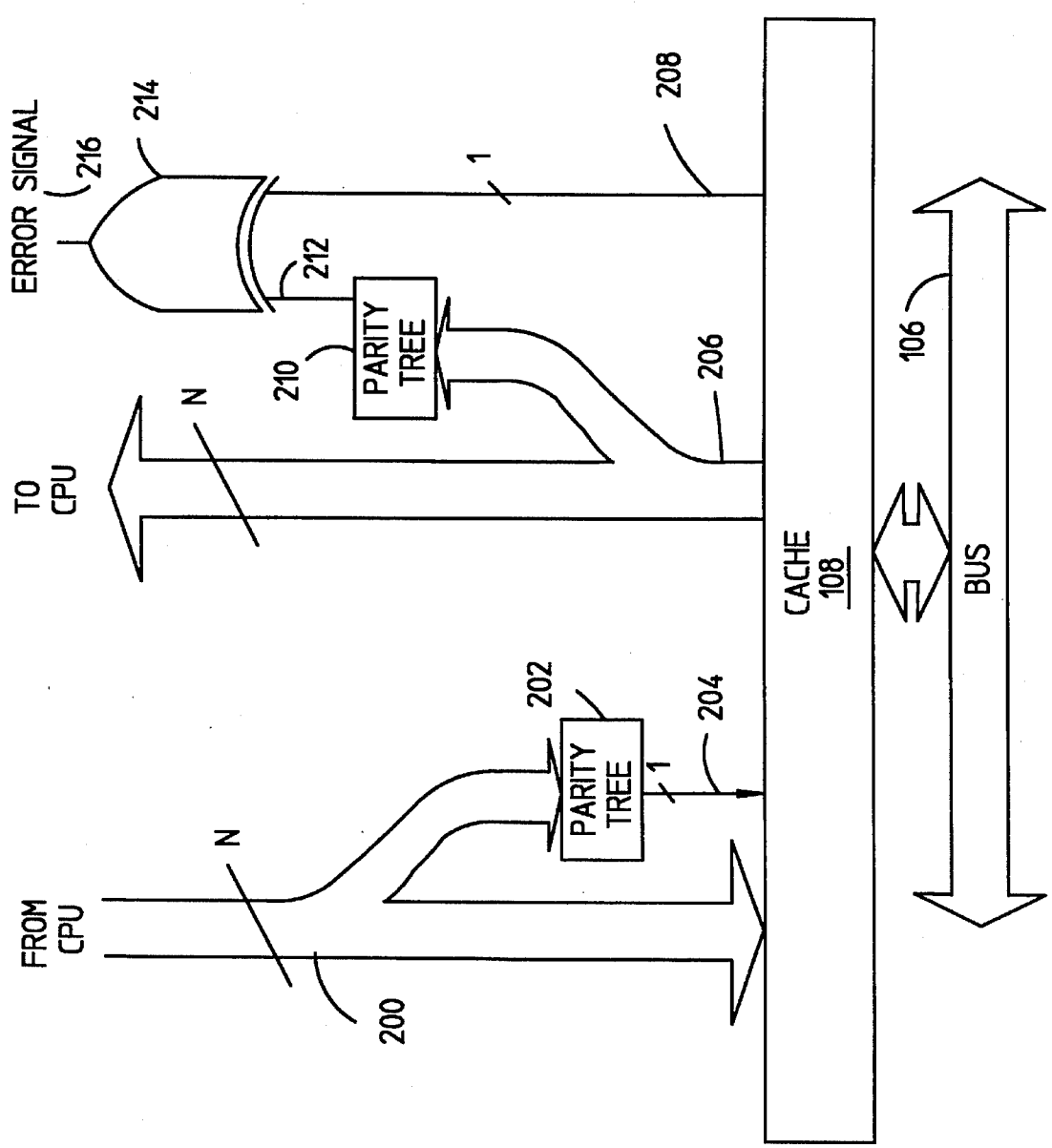
FIG. 2 is a block diagram illustrating additional detail for the computer system of FIG. 1 but without the invention.

FIG. 2 illustrates additional detail for the internal cache 108 of FIG. 1, configured without the invention. N bits of data 200 from the CPU are written to the cache 108. In addition, the N bits of data 200 are received by a parity logic tree 202 to compute one parity bit 204 that is also written to the cache. N bits of data 206 and one parity bit 208 are read from the cache 108. In addition, the N bits of data 206 are received by a second parity logic tree 2 10 to compute a parity bit 212 based on the data 206. Computed parity bit 212 is compared to the parity bit 208 read from the cache 108 by an EXCLUSIVE-OR gate 214. If the parity bits 208 and 2 12 are identical, the error signal 216 is logically FALSE. If the parity bits 208 and 212 are different, the error signal 216 is logically TRUE, indicating a read data parity error. In general, parity logic tree 202 can be identical to parity logic tree 212.

Figure 3:
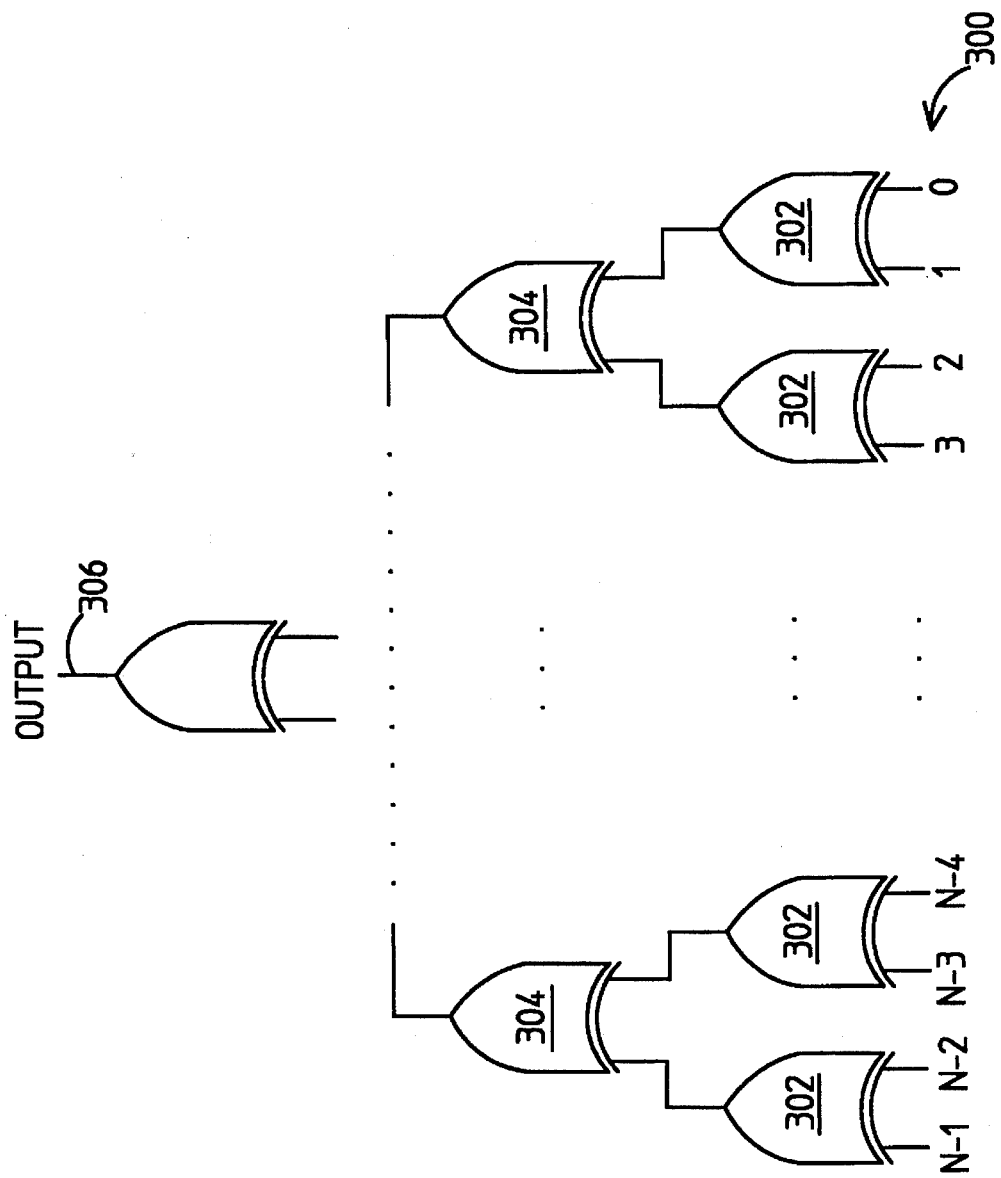
FIG. 3 is a logic diagram illustrating a logic tree for computing even/odd parity.

FIG. 3 illustrates an example parity logic tree. In FIG. 3, for an N-bit binary number 300, the bits are combined two at a time into a first rank of EXCLUSIVE-OR gates 302. If N is odd, one first rank gate may be eliminated. Likewise, the outputs of the first rank of EXCLUSIVE-OR gates 302 are combined two at a time into a second rank of EXCLUSIVE-OR gates 304 and so on for additional ranks until there is a single output 306. If an even number of input bits are logical TRUE, the output 306 is logical FALSE. If an odd number of input bits are logic TRUE, the output 306 is logical TRUE. For an N-bit binary number 300 where N is even, N–1 EXCLUSIVE-OR gates are required. EXCLUSIVE-OR gates are relatively complex, each gate requiring the logical equivalent of two inverters and three two-input gates. Therefore, a parity tree consumes significant space in an integrated processor.

Figure 4:
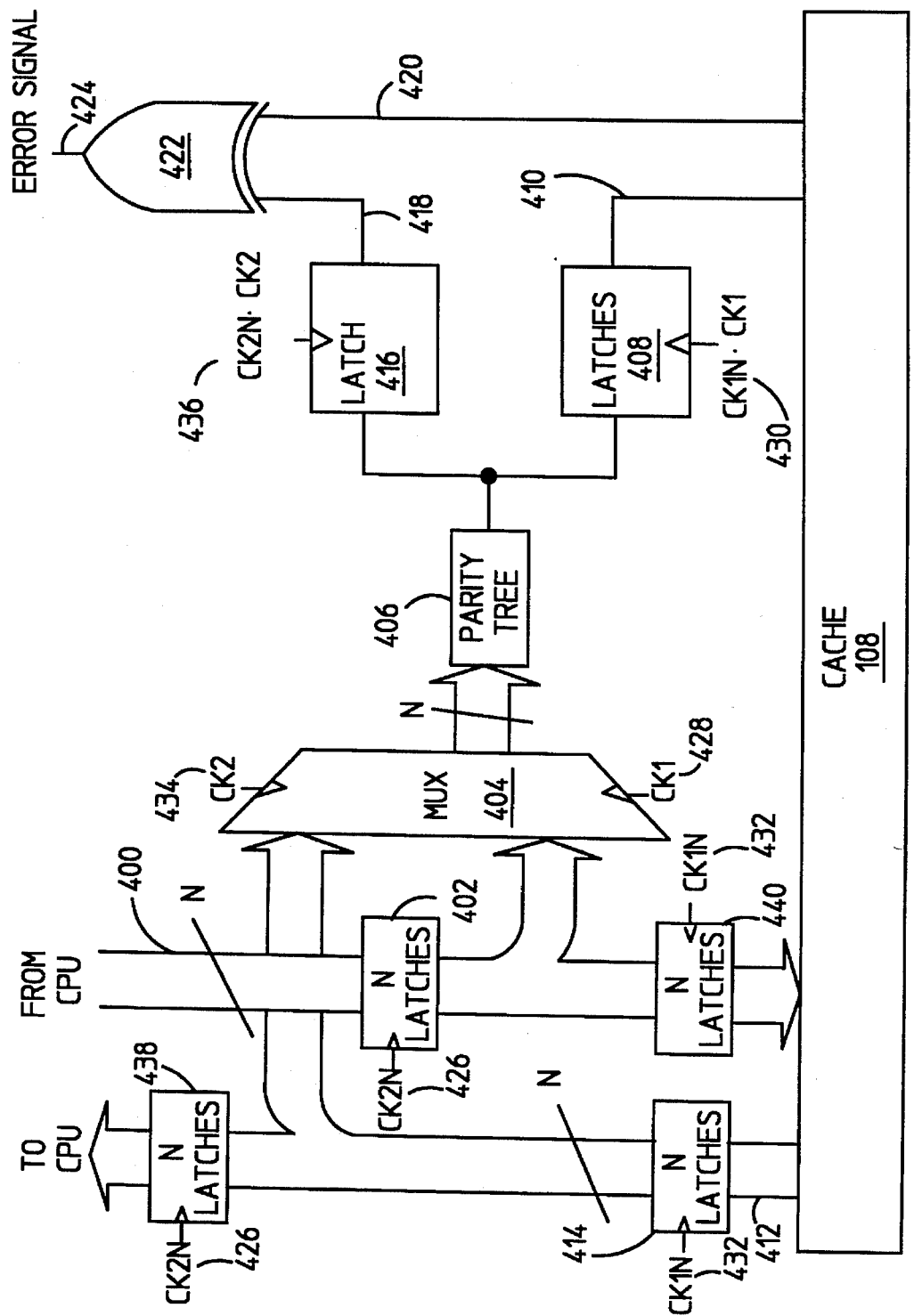
FIG. 4 is a block diagram illustrating additional detail for the computer system of FIG. 1 with the invention.

FIG. 4 illustrates additional detail for the internal cache 108 of FIG. 1, configured with the invention. In FIG. 4, N-bit data 400 from the CPU 100 is latched by N latches 402, selected by a multiplexer 404, received by a parity logic tree 406 and the output of the parity logic tree 406 is latched by latch 408. The output 410 of latch 408 is received by the cache as the computed parity bit for data 400. Output 410 is logically equivalent to FIG. 2, output 204. In FIG. 4, N-bit data 412 to the CPU is latched by N latches 414, selected by the multiplexer 404, received by the parity logic tree 406 and the output of the parity logic tree 406 is latched by latch 416. Latches 408 and 416 function as a demultiplexer, routing the output of the parity tree 406 to one of two paths. The output 418 of latch 416 is compared to parity bit 420 from the cache 108 by an EXCLUSIVE-OR gate 422. If the parity bits 418 and 420 are identical, the error signal 424 is logically FALSE. If the parity bits 418 and 420 are different, the error signal 424 is logically TRUE, indicating a read data parity error. The error signal 424 is logically equivalent to FIG. 2, error signal 216.

If latches 402, 414, 438 and 440 in FIG. 4 are dedicated to just parity computation then less circuitry is saved. However, in a typical CPU, data to and from memory is latched for multiple purposes. In a specific implementation of the invention, latches 402, 414, 438 and 440 would be present even without the parity computation circuitry. Therefore, the only incremental circuitry required for sharing is the multiplexer 404 (relatively simple switches) and latches 408 and 416.

Basically, the circuit of FIG. 4 computes parity for data being written to memory during a first clock phase and computes parity for data being read from memory during a second clock phase. The CPU completes one instruction each clock cycle (two phases). Therefore, data is read from cache with parity and written to cache with parity during a single computer instruction.

Figure 5A:
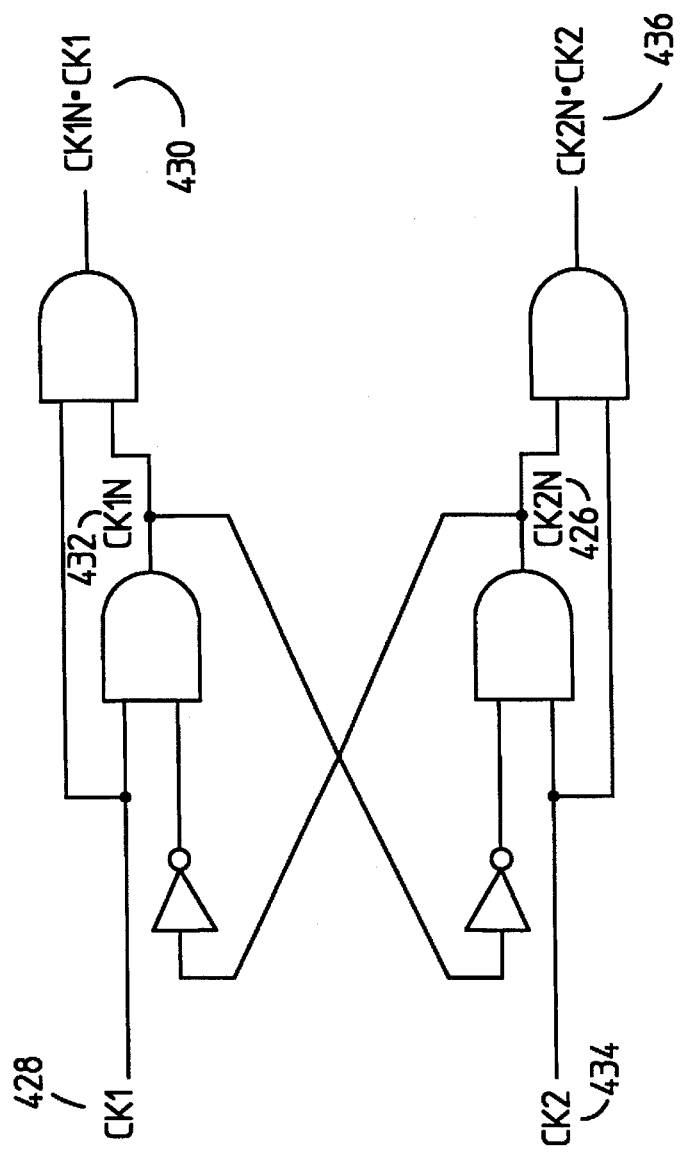
FIG. 5A is a logic diagram of a clock circuit for generating clock signals illustrated in FIG. 4.

Note in the specific embodiment illustrated in FIG. 4 that rather than one clock signal, six different clock signals (426, 428, 430, 432, 434, 436) are specified. In general, different clock signals are not needed as long as race conditions can be eliminated. In the specific implementation illustrated in FIG. 4, various overlapping and non-overlapping clock signals are available from the rest of system so the circuit of FIG. 4 takes advantage of readily available signals. FIG. 5A is a schematic of a clock circuit for generating the various clock signals and FIG. 5B is a timing diagram of the clock signals.

In FIGS. 5A and 5B, two complementary clock signals (CK1 428 and CK2 434) having a certain amount of unavoidable jitter and possible overlap are used to generate two other clock signals (CK1N 432 and CK2N 426) that are guaranteed to be non-overlapping. Note from FIGS. 5A and 5B that CK2N 426 must fall before CK1N 432 can rise and that CK1N 432 must fall before CK2N 426 can rise. In FIG. 5B, $t_1$ (500) and $t_3$ (504) are at the falling edge of CK1 (428) and $t_2$ (502) is at the falling edge of CK2 (434).

Comparing FIG. 4 and FIG. 5B, data 412 to the CPU is latched just after time $t_1$ (500). The data latched just after time $t_1$ (500) is selected by the multiplexer 404 at time $t_2$ (502) and the computed parity bit is latched by latch 416 at a time slightly after time $t_2$ (502). Data 400 from the CPU is latched just after time $t_2$ (502), selected at time $t_3$ (504) and the computed parity bit is latched by latch 408 at a time slightly after time $t_3$ (504).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A parity circuit located between a computer processor and a memory having separate read and write ports used by the computer processor, the parity circuit comprising:

a multiplexer having first and second data inputs, a data output, and a data control input, the first data input receiving data from the computer, the second data input receiving data from the write port of the memory, the control input receiving a clock signal having first and second clock states, the multiplexer routing the data from the computer to the data output when the clock signal is in the first clock state and routing the data from the write port of the memory to the data output when the clock signal is in the second clock state;

a parity logic tree, receiving data from the data output of the multiplexer, and generating a parity bit; and a demultiplexer, having a parity input, first and second parity outputs, and a parity control input, the parity input receiving the parity bit from the parity logic tree, the first parity output connected to the memory, the second parity output connected to the computer, the parity control input receiving the clock signal, the demultiplexer routing the parity bit to the memory when the clock signal is in the first clock state and routing the parity bit to the computer when the clock signal is in the second clock state.

2. A method of sharing a parity logic tree in a computer, the parity logic tree located between the computer and a memory having separate read and write ports used by the computer, the method comprising the following steps:

selecting data from the computer, by a multiplexer, during a first clock phase;

routing the data from the computer, by the multiplexer, to the parity logic tree;

generating a parity bit, by the parity logic tree;

receiving the parity bit, by a demultiplexer;

routing the parity bit to the memory, by the demultiplexer;

selecting data from the write port of the memory, by the multiplexer, during a second clock phase;

routing the data from the write port of the memory, by the multiplexer, to the parity logic tree;

generating a parity bit, by the parity logic tree;

receiving the parity bit, by a demultiplexer; and routing the parity bit to the computer by the demultiplexer.

* * * * *